United States Patent
Demeniuk et al.

(10) Patent No.: US 9,224,289 B2
(45) Date of Patent: Dec. 29, 2015

(54) SYSTEM AND METHOD OF DETERMINING OCCUPANT LOCATION USING CONNECTED DEVICES

(71) Applicant: Ford Global Technologies, LLC, Dearborn, MI (US)

(72) Inventors: Christopher Joseph Demeniuk, Shelby Township, MI (US); David Anthony Hatton, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 106 days.

(21) Appl. No.: 13/839,717

(22) Filed: Mar. 15, 2013

(65) Prior Publication Data

US 2014/0163774 A1 Jun. 12, 2014

Related U.S. Application Data

(63) Continuation-in-part of application No. 13/709,699, filed on Dec. 10, 2012.

(51) Int. Cl.
*G08C 17/02* (2006.01)

(52) U.S. Cl.
CPC ............ *G08C 17/02* (2013.01); *G08C 2201/34* (2013.01); *G08C 2201/91* (2013.01)

(58) Field of Classification Search
CPC ............... H04M 1/6075–1/6091; H04L 67/12; H04L 2012/40273; B60K 2350/35–2350/357; G08C 17/02; G08C 2201/34; G08C 2201/91
USPC ........................................................... 701/2
See application file for complete search history.

(56) References Cited

U.S. PATENT DOCUMENTS

| | | | |
|---|---|---|---|
| 7,026,957 B2 | 4/2006 | Rubenstein | |
| 7,266,435 B2 | 9/2007 | Wang et al. | |
| 7,489,786 B2 | 2/2009 | Marlowe | |
| 7,523,679 B2 | 4/2009 | Hawes et al. | |
| 8,180,379 B2 | 5/2012 | Forstall et al. | |
| 8,571,571 B2 | 10/2013 | Bauer et al. | |
| 2004/0260438 A1 | 12/2004 | Chernetsky et al. | |
| 2005/0027438 A1 | 2/2005 | Rockett et al. | |
| 2006/0138308 A1 | 6/2006 | Davis et al. | |
| 2007/0124043 A1 | 5/2007 | Ayoub et al. | |
| 2008/0261643 A1* | 10/2008 | Bauer et al. ................. 455/517 |
| 2009/0009983 A1 | 1/2009 | Eich | |
| 2009/0075624 A1 | 3/2009 | Cox et al. | |

(Continued)

*Primary Examiner* — Calvin Cheung
*Assistant Examiner* — Courtney Heinle
(74) *Attorney, Agent, or Firm* — Jennifer M. Stec; Brooks Kushman P.C.

(57) ABSTRACT

A vehicle computing system enabling one or more processors to establish a communication connection with at least one of a plurality of handheld computing devices within a vehicle while enabling and determining infotainment control based on the location of the handheld device in the vehicle. The system may determine if the at least one of a plurality of handheld computing devices is a driver or non-driver handheld computing device based on a detected location of the communication connection. The system may determine that the at least one of a plurality of handheld computing devices is a non-driver handheld computing device based on the detected location, therefore enabling infotainment control from the non-driver handheld device. The system may determine that the at least one of a plurality of handheld computing devices is a driver handheld computing device based on the detected location, therefore limiting infotainment control from the driver handheld device.

20 Claims, 10 Drawing Sheets

(56) References Cited

U.S. PATENT DOCUMENTS

| | | |
|---|---|---|
| 2011/0034128 A1 | 2/2011 | Kirsch |
| 2011/0087385 A1 | 4/2011 | Bowden et al. |
| 2011/0166748 A1 | 7/2011 | Schneider et al. |
| 2011/0196711 A1 | 8/2011 | Craig et al. |
| 2012/0030512 A1 | 2/2012 | Wadhwa et al. |
| 2012/0065815 A1 | 3/2012 | Hess |
| 2012/0079002 A1 | 3/2012 | Boll et al. |
| 2012/0106446 A1 | 5/2012 | Yousefi et al. |
| 2012/0115446 A1 | 5/2012 | Gautama et al. |
| 2012/0143404 A1 | 6/2012 | Zimmermann et al. |
| 2013/0030645 A1* | 1/2013 | Divine et al. ............... 701/36 |
| 2013/0066518 A1 | 3/2013 | Chen et al. |
| 2013/0117021 A1 | 5/2013 | James |
| 2013/0145360 A1 | 6/2013 | Ricci |
| 2013/0151031 A1 | 6/2013 | Ricci |
| 2013/0151064 A1 | 6/2013 | Becker et al. |
| 2013/0151111 A1 | 6/2013 | Skelton |
| 2013/0274997 A1* | 10/2013 | Chien ............... 701/36 |
| 2013/0301584 A1 | 11/2013 | Addepalli et al. |
| 2014/0088793 A1 | 3/2014 | Morgan et al. |

* cited by examiner

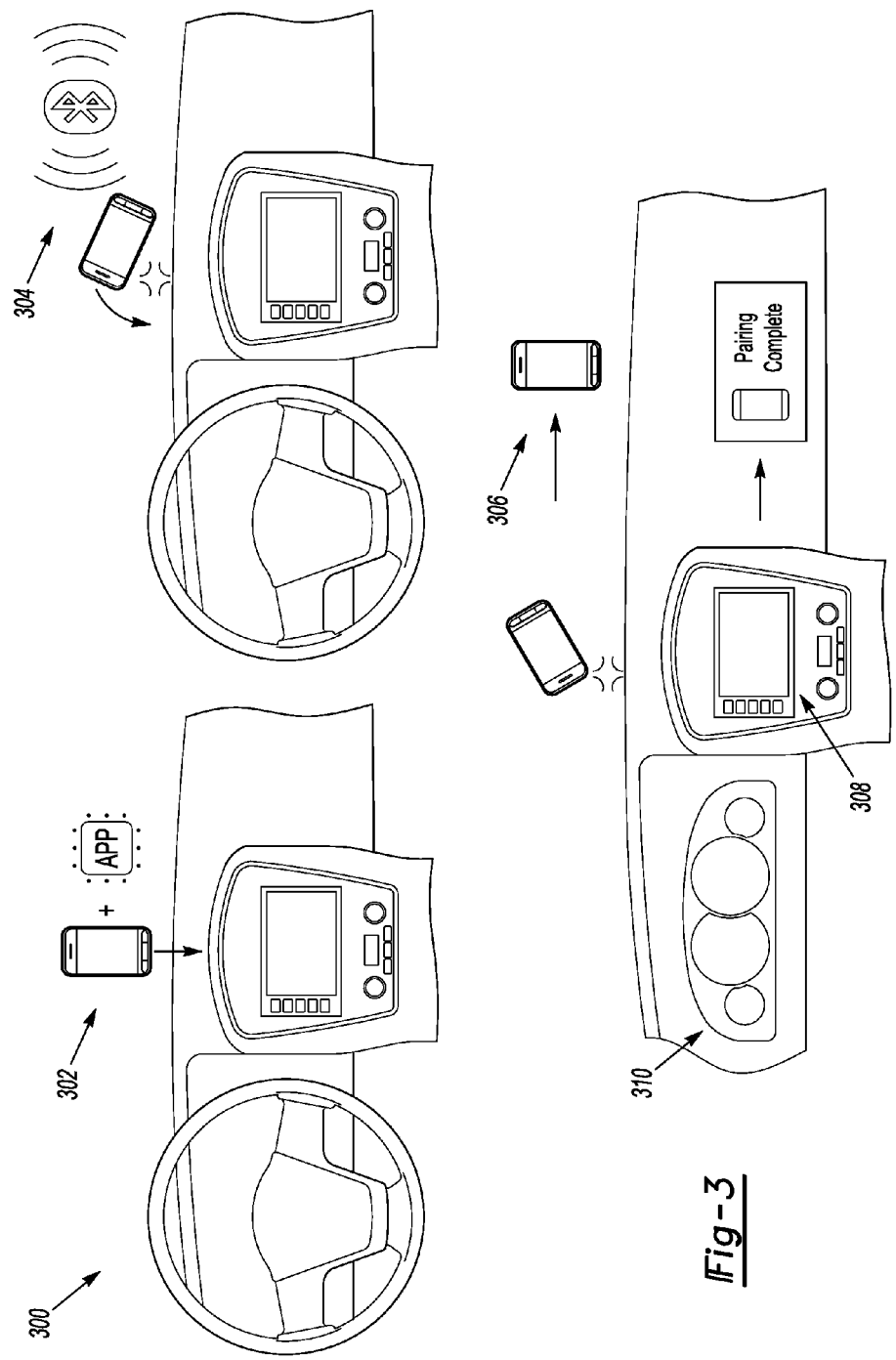

SYSTEM AND METHOD OF DETERMINING OCCUPANT LOCATION USING CONNECTED DEVICES

CROSS-REFERENCE TO RELATED APPLICATION

This application is a continuation-in-part of U.S. application Ser. No. 13/709,699 filed Dec. 10, 2012, the disclosure of which is incorporated in its entirety by reference herein.

TECHNICAL FIELD

Various embodiments relate to a vehicle information display system and a method of using the same.

BACKGROUND

U.S. Pat. No. 7,489,786 generally discloses an audio device integration system. One or more after-market audio devices, such as a CD player, CD changer, MP3 player, satellite receiver, DAB receiver, or the like, is integrated for use with an existing OEM or after-market car stereo system, wherein control commands can be issued at the car stereo and responsive data from the audio device can be displayed on the stereo. Control commands generated at the car stereo are received, processed, converted into a format recognizable by the audio device, and dispatched to the audio device for execution. Information from the audio device, including track, disc, song, station, time, and other information, is received, processed, converted into a format recognizable by the car stereo, and dispatched to the car stereo for display thereon. One or more auxiliary input sources can be integrated with the car stereo, and selected between using the controls of the car stereo. Both an audio device and one or more auxiliary input sources can be integrated together, and a user can select between the device or the one or more auxiliary input sources by issuing selection commands through the car stereo. A docking station is provided for docking a portable audio or video device for integration with the car stereo.

U.S. Patent Application 2009/0075624 generally discloses a remote application server that operates cooperatively with an embedded radio receiver in a vehicle. The remote application server can include a standalone portable device having memory for storing and independently presenting audio or data wirelessly received by the embedded receiver and a communication interface in the standalone portable device for receiving audio and data received at the embedded receiver and for transferring audio or data or both to and from a computer network when coupled to the network and for uploading stored audio or data or both to a user interface when coupled to the embedded receiver. The server can include a processor in the standalone portable device for remotely running applications on the standalone portable device that are presented on the user interface coupled to the embedded receiver via a thin client resident in the user interface or embedded receiver.

U.S. Patent Application 2012/0079002 generally discusses a user interacting with remotely executing mobile applications from a vehicle. The vehicle may include at least one computer that includes a human machine interface (HMI) for control by the user. The mobile applications may be executing on an application server that is remote from the vehicle and communicating with the at least one computer. Further, the mobile applications may be configured to receive inputs from and transmit outputs to the at least one computer. An HMI application executing on the at least one computer may enable the provisioning of one or more services of the HMI to the mobile applications so that inputs and/or outputs to the mobile applications may be exchanged. Vehicle-based operation of the mobile applications from the at least one computer via the HMI may thus be enabled.

U.S. Patent Application 2006/0138308 generally discusses an entertainment system including a control unit including at least one processor, and at least one portable device adapted to connect to the control unit and to store content, the at least one processor configured to detect the connection of the at least one portable device to the control unit and to automatically locate stored content upon detection of the at least one portable device.

SUMMARY

In a first illustrative embodiment, a computer readable storage medium stores instructions that, when executed by a processor, cause the processor to establish communication with at least one of a plurality of handheld computing devices connected to a vehicle computing system. The processor may receive input identifying a connected device as a non-driver handheld computing device based on a detected location of the communication connection established between the handheld device and the vehicle computing system. The processor may determine based on the detected location that the handheld computing device is a non-driver handheld computing device, therefore enabling infotainment control form the device. The processor may determine based on the detected location that the handheld computing device is a driver handheld computing device therefore limiting infotainment control from the device.

In a second illustrative embodiment, a vehicle computing system enabling one or more processors to establish a communication connection with at least one of a plurality of handheld computing devices within a vehicle and determine infotainment control based on the location of the handheld device in the vehicle. The vehicle computing system may determine if the at least one of a plurality of handheld computing devices is a driver or non-driver handheld computing device based on a detected location of the communication connection. The system may determine that the at least one of a plurality of handheld computing devices is a non-driver handheld computing device based on the detected location, therefore enable infotainment control from the non-driver handheld computing device. The system may determine that the at least one of a plurality of handheld computing devices is a driver handheld computing device based on the detected location, therefore limit infotainment control from the driver handheld computing device.

In a third illustrative embodiment, a computer-implemented method enables one or more passenger(s) to control vehicle systems using a handheld computing device. The computer-implemented method includes establishing communication with at least one of a plurality of handheld computing devices provided to a vehicle. The communication link between the handheld device(s) to the vehicle system(s) includes a connection using USB or BLUETOOTH technology. The computer implemented method may detect a location of the communication connection, and enabling infotainment control if the detected location is a non-driver location in the vehicle. The vehicle system(s) recognizes a connected handheld device as a non-driver handheld based on the detected location of the computing device. Once the non-driver handheld devices are connected and recognized by the vehicle-based computing system, the handheld devices may enable infotainment control including navigation destination input, climate control, entertainment system interaction, and seat adjustments.

BRIEF DESCRIPTION OF THE DRAWINGS

FIG. 3 is an illustrative example of configuring the infotainment system when a driver develops a favorable configuration offline;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

User interaction by a vehicle occupant with current vehicle computing systems can sometimes be cumbersome. For example, "core" controls, controls that are most commonly used, may not always be easily found and/or accessible to all occupants of the vehicle. As another example, the display may present items in such a manner that the vehicle occupant (s) may need to look at the display to select an operation. At times, this may even lead to an unpleasant riding experience for a passenger in the back seat since they often have zero interaction with the vehicle or its systems. Additionally, many vehicles are only equipped with one core controls display, usually located in the center stack.

Many passenger interactions with vehicle controls are often limited to power window control or climate adjustment. Front-seat passengers may be able to interact with center stack-mounted touchscreens, however these often enter reduced functionality mode while driving, rendering many of their features useless. As a result, passengers often look up information on their mobile phones, tablets, or other devices and attempt to verbally relay that information to the driver. The integration of handheld devices with the vehicle-based computing system and core operations of the vehicle infotainment system may allow limitless interaction with device applications and the vehicle to improve the passenger riding experience.

Figure 1:
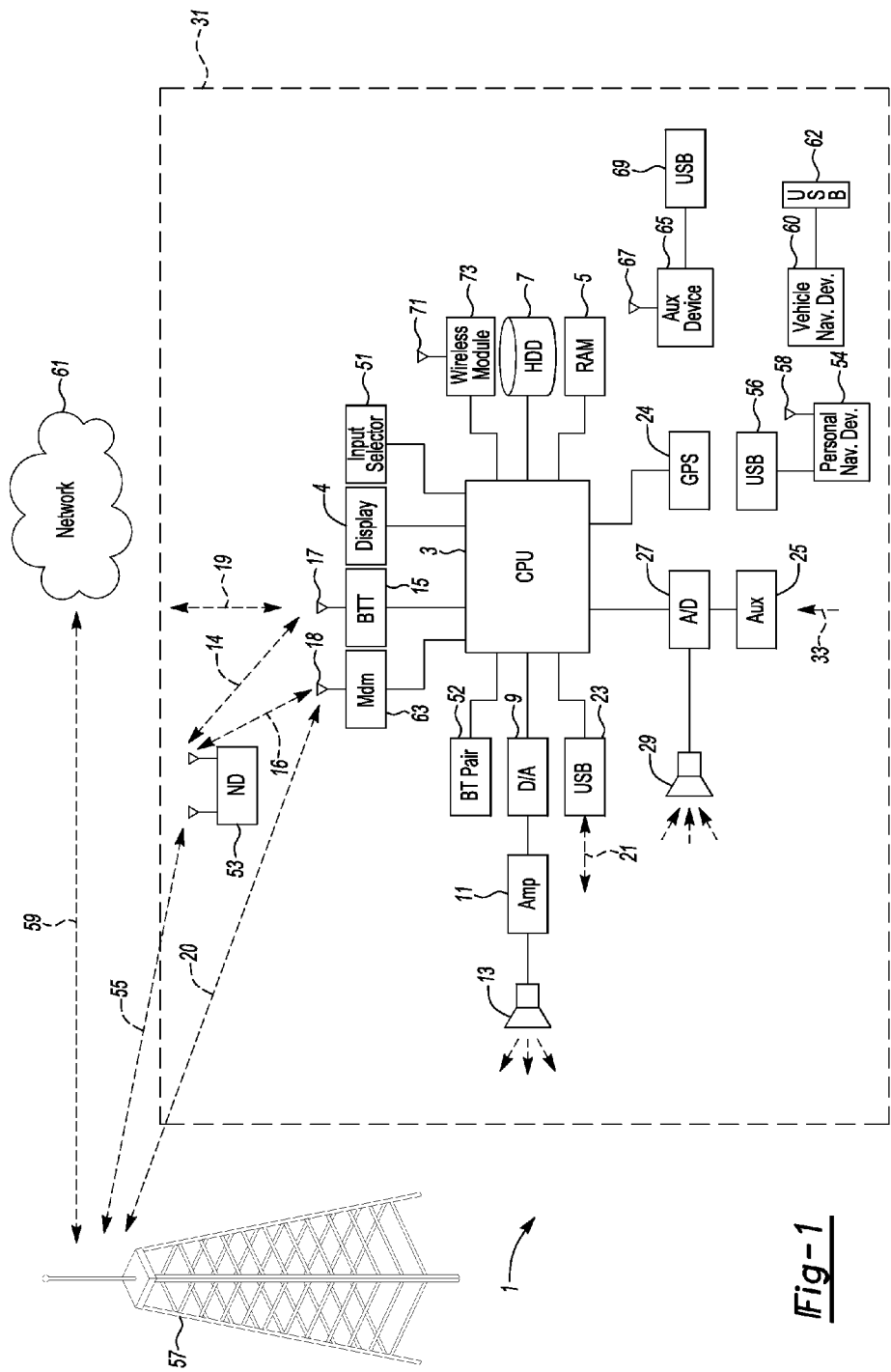
FIG. 1 is an exemplary block topology of a vehicle infotainment system implementing a user-interactive vehicle information display system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). BLUETOOTH is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having an exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as a vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2A:
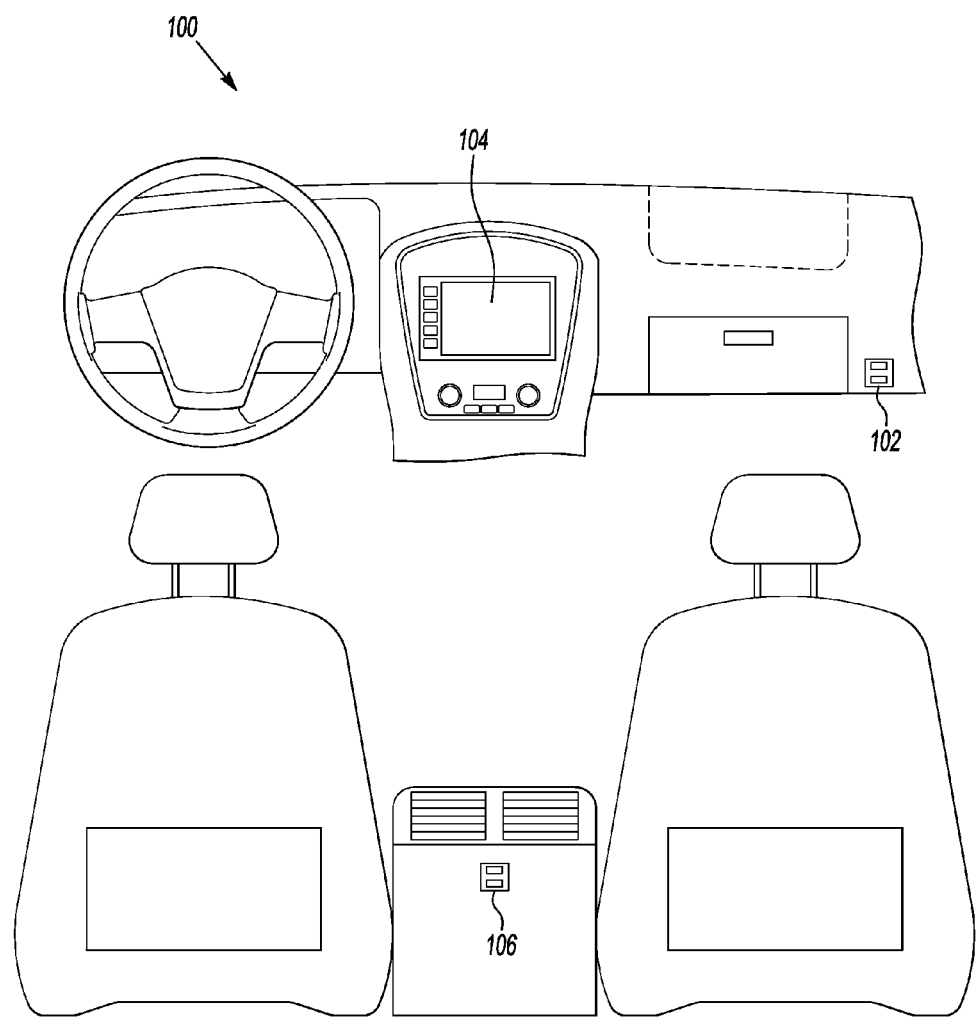
FIG. 2A is an illustrative example of connectivity for occupant seating locations to connect a brought-in device to the vehicle.

FIG. 2A is an illustrative example of connectivity for passenger seating locations to connect a brought-in device to the VCS. The pluralities of USB ports 100 are allocated to the front and backseat passengers for plug in access to use their nomadic devices with the VCS. The nomadic device being connected to the VCS may allow a driver or passenger to use their handheld device to control vehicle features including, but not limited to, navigation inputs, media selection, and/or climate control. The plurality of nomadic devices to control vehicle features may be used with the connection of the nomadic dives through the USB port or wirelessly using BLUETOOTH. The use of the term USB, herein, is not intended to limit the invention in any fashion, but rather is exemplary of a form of wired data connection. Other suitable wired or wireless data connections may be used.

In an embodiment shown in FIG. 2A, the USB port is securely mounted adjacent to the passenger door 102. The arrangement allows for employing a system and method for interconnecting a passenger's brought-in handheld device with the VCS. The VCS includes a display 104 that may be typically mounted in a centralized control area between the driver and front passenger. Allowing the passenger to plug into the VCS with their handheld device may give the passenger ability to control certain features of the VCS and update information on the display 104. Once the connected handheld device is recognize by the VCS as a non-driver handheld computing device, the system may allow the passenger to control functions that may be locked-out on an embedded display/control once the vehicle is in motion. The locked-out functions when a vehicle is in motion may include navigation system destination inputs.

Another embodiment allowing passenger nomadic device interconnection with the VCS is a USB port mounted for rear seat passengers 106. A rear seat passenger may plug in their nomadic device using the USB port to interact with the VCS. The rear seat passenger may allow information to be transmitted from their handheld device to the VCS including, but is not limited to, destination, music, and/or climate control adjustment. Allowing a rear seat passenger to plug into the VCS with their handheld device may give the rear seat passenger functions to control certain features of the VCS and present updated function or feature information on the display 104.

The location of the USB port connections allow the VCS to detect where the handheld device is being plugged in within the passenger compartment of the vehicle. Understanding the location of the handheld device may assist the VCS in identifying if the device is a non-driver handheld computing device. Using the USB ports, the VCS may identify occupant's location and assign priority levels for each plugged in device.

Using wireless connection (e.g., BLUETOOTH technology), the VCS may detect a non-driver handheld device by using many methods including, but not limited to, wireless zones within the passenger compartment of the vehicle. Setting up wireless zones within the passenger compartment may allow the VCS to identify locations of the handheld device communicating with the VCS. For example, if the handheld device is detected as being in the front passenger seat, the VCS may allow the passenger to access more functions than someone sitting in the backseat. Another example of determining occupant location within the passenger compartment of the vehicle may include, but is not limited to, near field communication, while assigning priority to each paired wireless device. Assigning priority to each handheld device connected to the VCS may determine which device controls a certain feature or function.

The passenger, or non-driver computing device, functions may include, but are not limited to, allowing the passenger to transmit ('push') information from the brought-in handheld device to the VCS. The information being transmitted may include, but is not limited to, navigation, waypoint, points of interest, and/or music. Allowing passengers to interface with the VCS may include configuration to the system via the brought in device to control their immediate physical environment including, but not limited to, climate control, fan speed, heat or cooled seat functions, and seat position. Another example of passenger functions may include, but is not limited to, navigation functions by allowing the passenger to search, set, or update the destination to which the vehicle is traveling, while the vehicle is in motion.

Another passenger function may include, but is not limited to, allowing the passenger to receive and request ('pull') information from the VCS to the handheld device. The information being received and requested may include, but not limited to, music, movies, photos, navigation data, and additional information being shared by other passengers connected to the VCS. Another example of passenger function data that may be received by one or more passengers communicating with the VCS may include, but not limited to, a playlist that may have been shared by one passenger to the VCS and downloaded from the VCS to another passenger's handheld device.

Figure 2B:
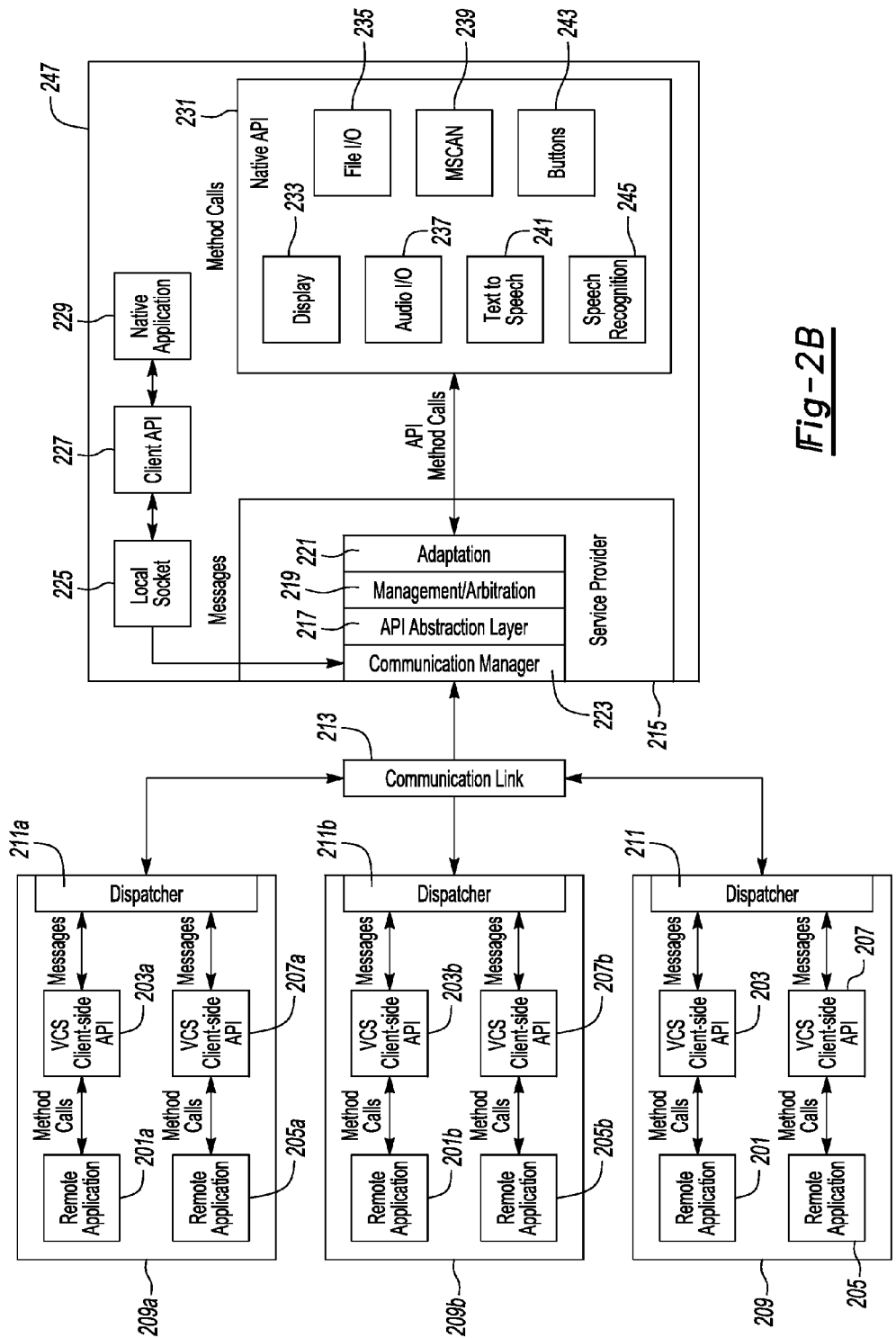
FIG. 2B shows an illustrative example of one or more remote device running one or more applications in communication with a vehicle based computing system.

FIG. 2B shows an illustrative example of one or more handheld devices running one or more applications in communication with a vehicle based computing system. The handheld devices may be operated by occupants throughout the passenger compartment, including passengers in the rear seats. The illustrative example of one or more handheld devices 209, 209a and 209b are represented in the figure as an example of multiple devices communicating with the VCS. In this illustrative embodiment, a handheld device 209 (e.g., without limitation, a cell phone, PDA, GPS device, etc.) has one or more remote applications 201, 205 stored thereon. The remote applications communicate with the vehicle based computing system 247, using a vehicle computing system (VCS) client side API 203, 207. This API could, for example, be provided to developers in advance, and define the format of outgoing and incoming packets so that communication between the handheld device 209 and the vehicle based computing system 247 is possible. A dispatcher 211 can be provided to the handheld device 209 if more than one application is communicating at the same time.

Data is passed from the handheld device to the vehicle communication system through a communication link 213. This can be a wired or wireless link, and can be half or full duplex. In one non-limiting example, the link is a BLUETOOTH link.

The vehicle based communication system has various applications stored thereon, including, but not limited to: a communications manager 223, an API abstraction application (or layer) 217, a management and arbitration application 219, and an adaptation application 221 (these applications can also be layers of a single or plurality of applications, such as a service provider application 215).

In this exemplary implementation, the communication manager 223 handles all transports, forwarding incoming messages to the API abstraction application (or layer) 217, and ensuring that outgoing messages are sent via the proper transport channel. The communication manager 223 may also determine priority of messages received from one or more handheld devices connected simultaneously to the vehicle based computing system 247. The vehicle owner or driver may configure certain communication and priority settings allowing certain handheld devices, or passengers to communicate to the vehicle based computing system 247.

In this exemplary implementation, the abstraction application 217 transforms incoming messages into action to be performed by a service and creates outgoing messages out of information and events from local modules.

In this exemplary implementation, the management and arbitration application 219 virtualizes the local vehicle based computing system for each application by managing use of HMI elements and governing resource consumption.

In this exemplary implementation, the adaptation application 221 encapsulates the local API and coexistence with core local applications. This application may be modified or replaced to allow a communication connection to compatible with different versions of the vehicle based computing system software.

In at least one exemplary implementation, a message protocol may be used to encode messages exchanged between a mobile client and the vehicle based computing system to command and control a Human Machine Interface (HMI) for purposes such as displaying and speaking text, listening, propagating button-pushes, etc. These messages may contain small amounts of data (e.g. text phrases, button identifiers, status, thumb-drive file data, configuration data, etc.). This protocol, using complementary support provided by the message specification, may permit multiple passenger application sessions to concurrently use a single transport channel.

Other open standard protocols may be used where appropriate and available, such as the A2DP BLUETOOTH profile for streaming audio from the mobile device to the vehicle audio system (not all mobile devices support A2DP). However, some open standard protocols are not always available on every mobile device, or are not always implemented uniformly. In addition, API support for use of these protocols may not be uniformly implemented on all mobile platforms. Therefore, the function of some open standard protocols (e.g. OBEX) may be provided as part of the message protocol, when it is technically simple enough to do and a significant increase in uniformity can be achieved across platforms.

Transports may be configured to support full-duplex communication in order to provide prompt event propagation between passenger applications and the vehicle based computing system. A transport may also support multiple concurrent channels in order to permit concurrent connections from one or more devices.

One or more exemplary transports are Serial (RS232) and TCP/IP. Serial transport communication with mobile devices may provide, for example, through a BLUETOOTH Serial Profile. Most mobile devices support this profile, and most provide a common programming model for its use. The serial programming model is widely used and highly uniform. If the vehicle based computing system provides Serial-over-USB support, then the Serial transport could be used with any mobile device that is USB-connected to the vehicle based computing system (if that mobile device provides support for Serial over its USB connection).

In addition, a TCP/IP transport provides the ability for applications running on the vehicle based computing system to use the local HMI. If the module provides external TCP/IP connectivity in the future, this transport will allow external clients to connect over that TCP/IP connectivity. The socket programming model (including the API) for TCP/IP is typically highly portable. Such an example would be a locally loaded application 229, using a client-side API 227 to communicate through a local socket 225.

In at least one exemplary embodiment, the decoupled nature of the system, where the vehicle based computing system is unaware of one or more occupant applications until they connect, demands a discovery mechanism whereby system and the mobile device can discover each other's existence and capabilities.

Multiple discovery is possible, whereby the mobile device passenger may be able to discover the environment, locale and HMI capabilities of the local platform and the system may be able to discover the applications available on one or more handheld devices while having the ability to launch those applications.

In this illustrative embodiment, the native API 231 has various services associated therewith, that can be accessed by handheld devices through function calls. For example, a display function 233 may be provided.

The system may provide an API allowing occupant's applications to write to vehicle displays and query their characteristics. The characteristics of each display may be described generically such that occupant's applications may not require hard coding for individual display types (Type 1 FDM, Type 3 GAP, Type 6 Navigation, etc). Specifically, the system may enumerate each display and indicate each display's intended usage (primary or secondary display). Furthermore, the system may enumerate the writable text fields of each display, provide each writable text field's dimensions, and indicate each field's intended general usage. To promote consistency with the current user interface, support for the scrolling of long text may also be included, where permitted by driver distraction rules.

The system may also include text to speech capability 241. The system may provide an API allowing occupant's applications to leverage the vehicle based computing system's text-to-speech functionality. Client applications may also be able to interleave the play of audio icons with spoken text. They may be able to utilize preexisting audio icons or provide short audio files of their own. The format of application provided audio files may be limited to those natively supported.

Further functionality of the illustrative embodiments may include one or more button inputs 243. One example of this would be controlling an application on a handheld device through use of buttons installed in a vehicle (such as steering wheel buttons).

Another exemplary function could be a speech recognition function 245. The system may provide an API allowing client applications to leverage the vehicle based computing system's speech recognition capabilities. The system may also simplify the vehicle based computing systems' native speech recognition APIs to provide a simpler development model for client application developers. The speech grammar APIs will also be simplified while retaining most of the native API's flexibility. For example, the system (on behalf of client applications) will recognize global voice commands such as "Front Seat Occupant", "BLUETOOTH Audio" or "USB" and pass control to the appropriate handheld device and/or application.

Audio I/O 237 may also be provided in an exemplary implementation. The system may provide regulated access to the HMI while enforcing the interface conventions that are coded into core applications. A single "in focus" occupant application may be allowed primary access to the display, buttons, audio capture or speech engine. Occupant's applications without focus (e.g. Text Messaging, Turn By Turn Navigation, etc.) may be allowed to make short announcements (e.g. "New Message Arrived" or "Turn Left"). Stereo audio may continue to play after a mobile device audio application.

The system may provide an API allowing client applications to capture audio recorded using a microphone. The client application may specify duration of the capture, though capture can be interrupted at any time. Captured audio may be returned to the occupant's application or stored on a local or portable drive. The one or more handheld devices may have access to the captured audio and may download to one or more passenger handheld devices.

Additionally, file I/O 235 may also be provided with the system. For example, the system may provide an API allowing occupant's applications to read from, write to, create and/or delete files on a remote drive. Access to the remote drive file system may be restricted in that a client application may only read/edit data in a directory specific to that occupant's application.

Finally, the system can provide various forms of security, to ensure both system integrity and driver safety. The system APIs may be limited to prevent inadvertent or malicious damage to the system and vehicle by a passenger application, including (but not limited to): Limited access to the vehicle CAN bus; limited access to a local file system; no or limited access to audio output volume; no access to disable PTT (push-to-talk), menu, or other buttons that a developer may deem essential; and no access to disable system voice commands or media player source commands.

Additionally, passenger applications connecting to the VCS must be approved by the driver or vehicle owner. For example, the following criteria may be used: the driver or vehicle owner may install the passenger application on their mobile device; passenger applications connecting via BLUETOOTH must be running on a mobile device paired by the driver or vehicle owner to the vehicle based computing system module on which the system is running; and applications running locally on the module must be installed onto the module by the vehicle owner.

Another example of a handheld devices connecting to the VCS is via a USB port. The passenger's handheld device may be connected using a USB port connected to the VCS. The driver and/or vehicle owner may approve the connection between the passengers handheld device with the VCS. The driver and/or vehicle owner may select certain restrictions and priority levels associated with the occupant's handheld device.

The system may also use signed and privileged applications. For example, general applications may be signed with a VIN-specific certificate that allows them to interact only with specific vehicle(s). Certificates will be attached to the application install when the vehicle owner, driver, or passenger obtains the application from the distribution model. Each certificate may contain an encrypted copy of a VIN-specific key and the application's identity. Upon connecting to the service, the application identity string and certificate are sent. The system decrypts the certificates, and verifies that the VIN key matches the module, and that the application identity matches that which is sent from the application. If both strings do not match, further messages from the application may not be honored. Multiple keys may be included with an application install to allow the application to be used with multiple vehicles.

In another illustrative example, privileged applications must run natively on the module itself. These applications must go through a standard code signing process required for all local applications. Applications that go through this process may not suffer from the same impersonation weakness experienced by general applications.

In addition to acting as a through-way for published data, the vehicle computing system itself could publish data for subscription. For example, GPS data linked to the vehicle computing system could be published by the vehicle computing system and subscribed to by applications desiring to use the data. These are just a few non-limiting examples of how publication/subscription can be used in conjunction with the illustrative embodiments.

FIG. 3 is an illustrative example of configuring the infotainment system offline and synchronizing the configuration with the vehicle before a driving event. This includes configuration of the infotainment system 300 when a driver develops a favorable configuration offline with a handheld device using an application, then pushes the configuration to the VCS using a driver-only connection point. The driver may configure specific features or function to display when driving the vehicle by using an application on a nomadic device offline and to later synchronize the configuration to the VCS. The offline application may include, but not limited to, configuring of the instrument panel, centralized control display, seat position, and ambient lighting within the vehicle. The configuration may include the display of data on the instrument panel, for example, the presentation of fuel economy data or navigation information.

Once the configuration has been done offline with the use of the nomadic device application to, for example, without limitation, a smart phone application, the configuration may be synced with the VCS. At step 302, using BLUETOOTH communication with the VCS and a smart phone, the driver enables the smart phone to connect with the VCS to begin the hands-free transmission of the offline configuration to the VCS. If the smart phone device has been already paired with the VCS, the smart phone will automatically connect when it is within certain proximity of the VCS.

At step 304, once the smart phone has been brought into proximity of the VCS the BLUETOOTH synchronization may begin. Once the smart phone is synchronized with the VCS, the driver may select the configuration application to send over to the VCS. At step 306, the smart phone may begin transmitting the configuration data over to the VCS. Once the configuration has been sent, the VCS may begin to initialize the systems in response to the offline configuration data.

At step 308, the centralized control display may notify the driver when the synchronization is taking place and when it is complete. Once complete, the centralized control display may be configured based on the offline configuration application settings. For example, the centralized control display may be configured to the radio preset settings requested by the driver and configured based off the synchronization of the offline configure application settings to the VCS. At step 310, the instrument panel (or display information center) may be configured to display certain features and settings based on the offline configuration application settings. For example, the instrument panel may display specific information requested by the driver based on the offline configuration applications settings including, but not limited to, navigation directions, fuel economy information, display color and graphics, or engine performance parameters.

Figure 4:
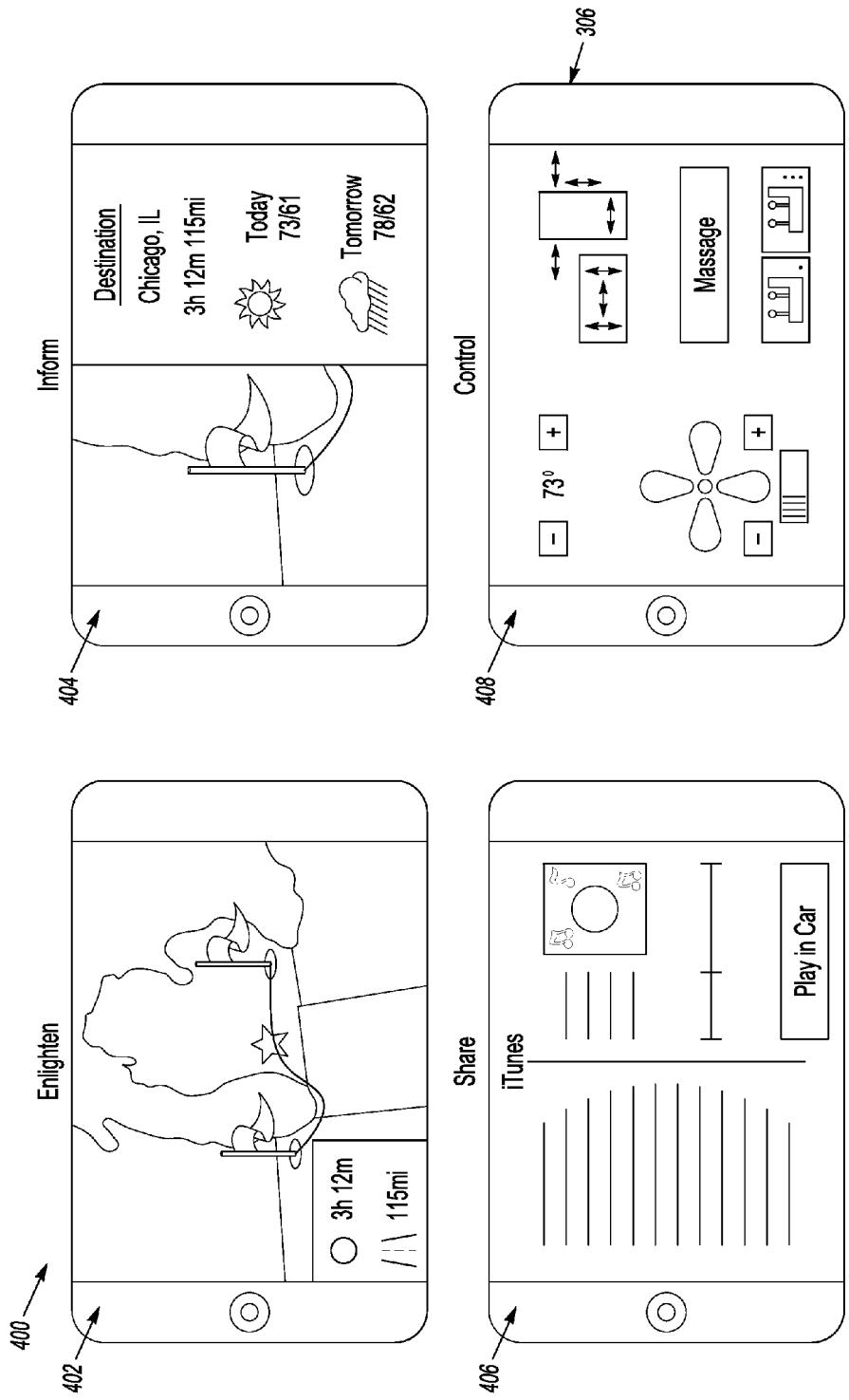
FIG. 4 is an example of illustrate embodiments disclosing several infotainment features an occupant may interrelate while connected to the vehicle-based computer with their handheld computing device.

FIG. 4 is an example of embodiments disclosing several infotainment features an occupant may communicate with using their nomadic device connected to the vehicle-based computer. The infotainment features that a customer may control using their nomadic device 400 may include, but is not limited to, navigation directions, destination information, vehicle climate controls, seat adjustment, and music selection. The infotainment features may be shared or adjusted by the customer's nomadic device interfacing with the VCS. The driver may set restrictions on what options or features an occupant may have access to control, adjust, download and/or share.

One of the embodiments of infotainment features shown in FIG. 4 includes, but is not limited to, navigation directions 402 interaction with the occupant's smart phone communicating with the VCS. Once the occupant is communicating with the VCS, he may be allowed to update the navigation display controls within the navigation system while the vehicle is parked or in motion. The passenger's handheld device may update the vehicle navigation system by outputting information from the handheld device to the VCS. The occupant interaction with navigation information allows for information to be communicated to the driver through the occupant's handheld device to the VCS, and displayed on the instrument panel or centralized control display. Many in-vehicle navigation system controls are locked when a vehicle is in gear or in motion, thus preventing a vehicle driver to update navigation destination inputs unless the vehicle is parked. Instead of preventing interaction with the navigation system while the vehicle is in motion, a passenger may control the navigation input using their handheld device in communication with the VCS while the vehicle is in motion. Allowing a passenger to control navigation input with their handheld device may help the driver reach their destination without requiring to pull the vehicle over to park and update the navigation system.

Another exemplary infotainment feature is the information feature allowing the occupant to display destination data 404 to the instrument panel or centralized control display. The destination data may include, but is not limited to, a point of interest, or a certain destination category the occupant may be looking for. The destination information may be looked up by the occupant and presented to the other occupants or driver within the vehicle using the infotainment LCD touchscreen, driver's instrument panel, or the other handheld devices connected to the VCS. This information may include, but is not limited to, weather conditions, traffic, and/or points of interest located around the vehicles current location.

An exemplary embodiment may be route determination or navigation direction 402 sent by the occupant's handheld device to the VCS. Many vehicle navigation systems prohibit a vehicle occupant from entering a new destination into the navigation system once the vehicle is moving. Allowing an occupant to be able to interact with the VCS using their handheld device may improve the driving experience when traveling to an unknown destination or if the driver needs additional directions. The vehicle displayed navigation information may be updated by an occupant's handheld device transmitting a message to the VCS.

An occupant's nomadic device connected to the VCS may also share information including, but not limited to, music, movies, and other entertainment features 406 that may be transmitted to the VCS. For example, the nomadic device may share a play list or music selection and transmit this to the VCS allowing for the music to be heard over the vehicle's entertainment system. An occupant in the back seat may now be able to share information from their smart phone, and distribute to the VCS entertainment system at the same time other occupants are connected to the VCS. The passenger in the front seat may enjoy the playlist that was shared by the backseat passenger and download it to their handheld device form the VCS. The transmitting of a playlist and/or receiving a playlist from a passenger to another passenger within the vehicle compartment may be done with the use of the VCS as an interface.

The occupants may also control the environment of the vehicle by allowing adjustment of certain climate features including, but not limited to, temperature, fan speed, heated or cooled seats, and seat position 408. With the popularity of smart phones, this feature may allow the elimination of additional control knobs and buttons throughout the occupant side and rear seats of the vehicle. The occupant's smart phone connected to the VCS may also be used to control the climate within the occupant's area of the vehicle and positioning of the occupant's seat. The passenger's handheld device may control these features and functions with the use of a software application, or once connected to the VCS as a Ghost Control with a host program installed on the VCS. The VCS may synchronize while pushing software onto the handheld device so that it is configured to control certain infotainment features and functions.

Figure 5:
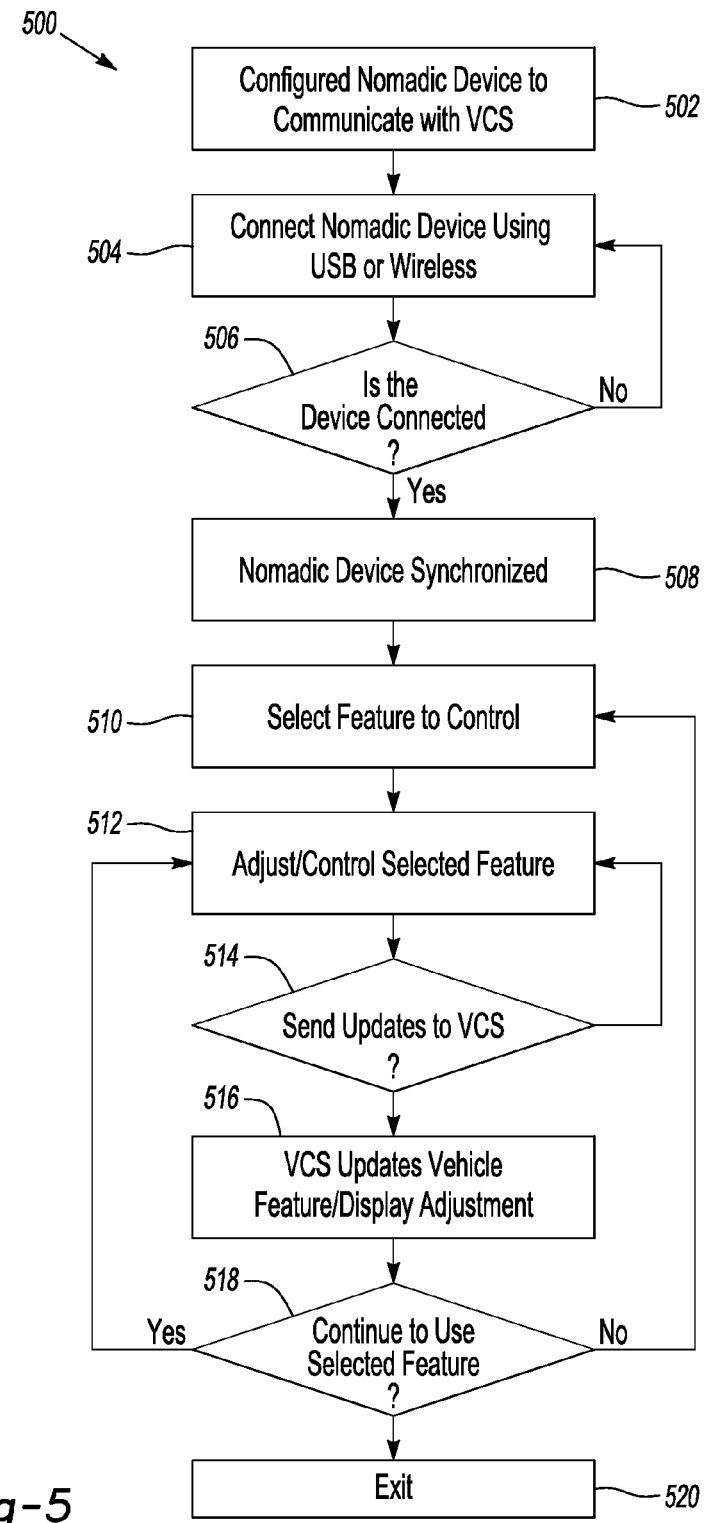
FIG. 5 is a flow chart illustrating an example method of a handheld computing device controlling selected vehicle features.

FIG. 5 is a flow chart illustrating an example method of a nomadic device controlling selected vehicle features. The nomadic device may be connected to the VCS to control vehicle features 500 using a USB port, or wirelessly with BLUETOOTH technology. The nomadic device, for example, a smart phone, may download an application that configures the smart phone to interact with the VCS at step 502.

At step 504, the connection of the nomadic device to the VCS may begin once the device connects using the USB port or is within the range to be to be detected by BLUETOOTH. Once the smart phone is connected to the VCS an attempt to synchronize the device with the system may begin at step 506. If the device is connected, synchronization may begin allowing the smart phone to access vehicle features that can be adjusted, updated, or modified at step 508. The synchronization step may include, but not limited to, having the smart phone configured to have the vehicle features' current settings shown on the smart phone display screen.

At step 510, after synchronization, the occupant may select a vehicle feature to control. Using their handheld device, the occupant may have control of vehicle systems, including but not limited to, climate control, navigation command, and/or media selection. For example, the navigation feature may be locked out once the vehicle is moving causing no input by any occupant in a vehicle. With the use of multiple occupant nomadic device connections to the VCS, a passenger may command a navigation direction using their smart phone and communicate this information to update the VCS for display to the driver. At step 512, the occupant may use their nomadic device to include, but not limit, send navigation directions to the vehicle display, adjust climate controls, command media displays, or control their seat position.

At step 514, the occupant may send the control options using their smart phone to the VCS. The VCS may receive the information and process the request from the smart phone to update/adjust vehicle features at step 516. This allows a vehicle occupant to update a portion of infotainment control input from their non-driver handheld computing device to a vehicle display. The occupant may continue to operate the selected vehicle feature using their smart phone or decide to select another vehicle feature to control at step 518. Once the occupant has completed their request using their nomadic device, they may have the option to exit the application at step 520.

Figure 6:
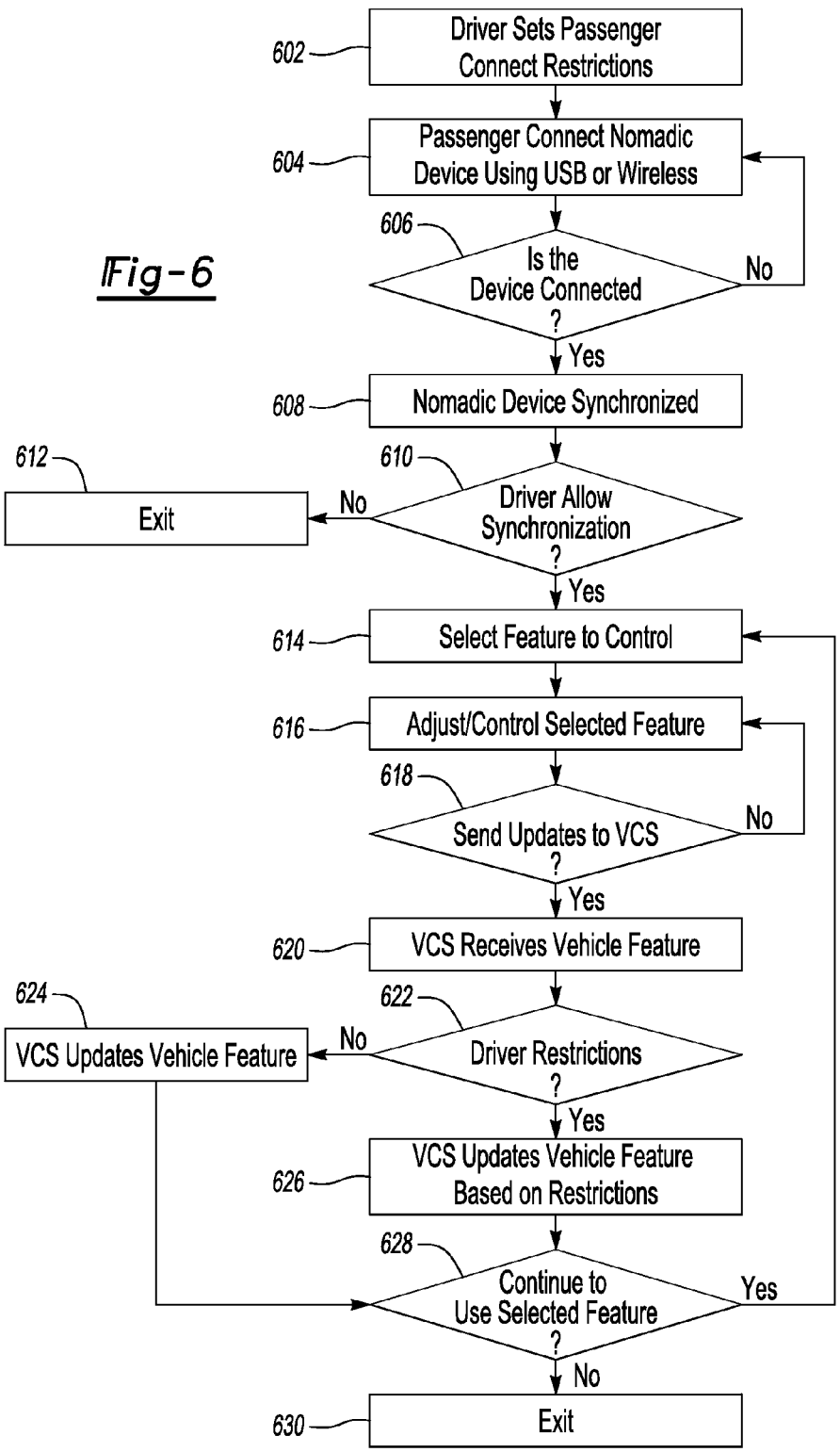
FIG. 6 is a flow chart illustrating an example method of a driver restricting a passenger's handheld computing device control of vehicle features.

FIG. 6 is a flow chart illustrating an example method of a driver restricting a passenger's nomadic device control of vehicle features. The driver or owner of the vehicle may limit the use of an occupant's control of vehicle features using their nomadic device 600. At step 602, the driver may set passenger restrictions to prevent the occupant from controlling certain vehicle features with their nomadic device. For example, the driver may restrict the passenger from operating media controls like volume adjustment using their smart phone. Another exemplary example may be the driver limiting the passengers in the rear seats from operating climate controls.

At step 604, once an occupant enters a vehicle, their nomadic device may be connected to the VCS. The occupant may connect their nomadic device with the VCS using, but not limited to, USB, BLUETOOTH, or other means of connecting for communication between the device and system. At step 606, the VCS may recognize the occupant's nomadic device and allow connection to the system. If the VCS does not recognize the occupant's nomadic device it may decline connection to the system. The driver may inhibit or limit certain occupant connections based on previously set occupant restrictions. If the nomadic device is connected by the VCS, the system may start synchronization with the nomadic device at step 608. Synchronization includes, but not limited to, the current control status of the vehicle features from the VCS to the nomadic device.

At step 610, the driver or owner of the vehicle may allow synchronization of certain nomadic devices. For example, the owner of the vehicle may not allow passenger synchronization of multiple nomadic devices when someone other than the owner is driving the vehicle. In the event the vehicle detects that the driver is the owner of the vehicle, the VCS may grant all passenger nomadic device synchronization requests. In the event the vehicle detects that the driver is a secondary driver (e.g. temporary user, teenager, employee, etc.), the vehicle may not allow synchronization of passenger nomadic devices at step 612.

At step 614, the passenger may select a vehicle feature to control once the nomadic device has been synchronized with the VCS. For example, the passenger's smart phone may select media controls and push a playlist form their smart phone to the VCS to play over the vehicle's entertainment system. The passenger may adjust and control the selected vehicle feature that may include, but not limited to, selecting the song to play, controlling music volume, and/or adjusting tuning features of the entertainment system at step 616.

At step 618, once the passenger adjusts the selected vehicle feature they may have the option to send that change to the VCS. Once the passenger verifies the adjustment or control command of the selected vehicle feature, the nomadic device is enabled to transmit instruction and commands to the VCS. At step 620, the VCS may receive the transmitted commands from the passenger's nomadic device.

At step 622, the VCS may look at the command from the passenger's nomadic device and check to see if the driver has set certain restrictions to either prevent or allow the commanded control of the vehicle feature. If no driver restrictions are present, the VCS may allow the passenger's nomadic device requested control command. If there are driver restrictions in place, the VCS updates the passenger's control command vehicle feature based on the restrictions at step 626. It must be stated that the VCS may prioritize passenger's nomadic device commanded controls requested allowing a ranking between the multiple nomadic devices connected to the VCS at the same time. The prioritization may be configured by the driver, owner or other passengers communicating with the VCS.

At step 628, the passenger may continue to instruct and control the selected vehicle feature, or select another vehicle feature to control. If the passenger selects another vehicle feature to control, the VCS may limit the amount of control allowed to the passenger based on the owner or driver restrictions. At step 630, the passenger may request to exit the interaction with the VCS, and disconnect communication from the system.

Figure 7:
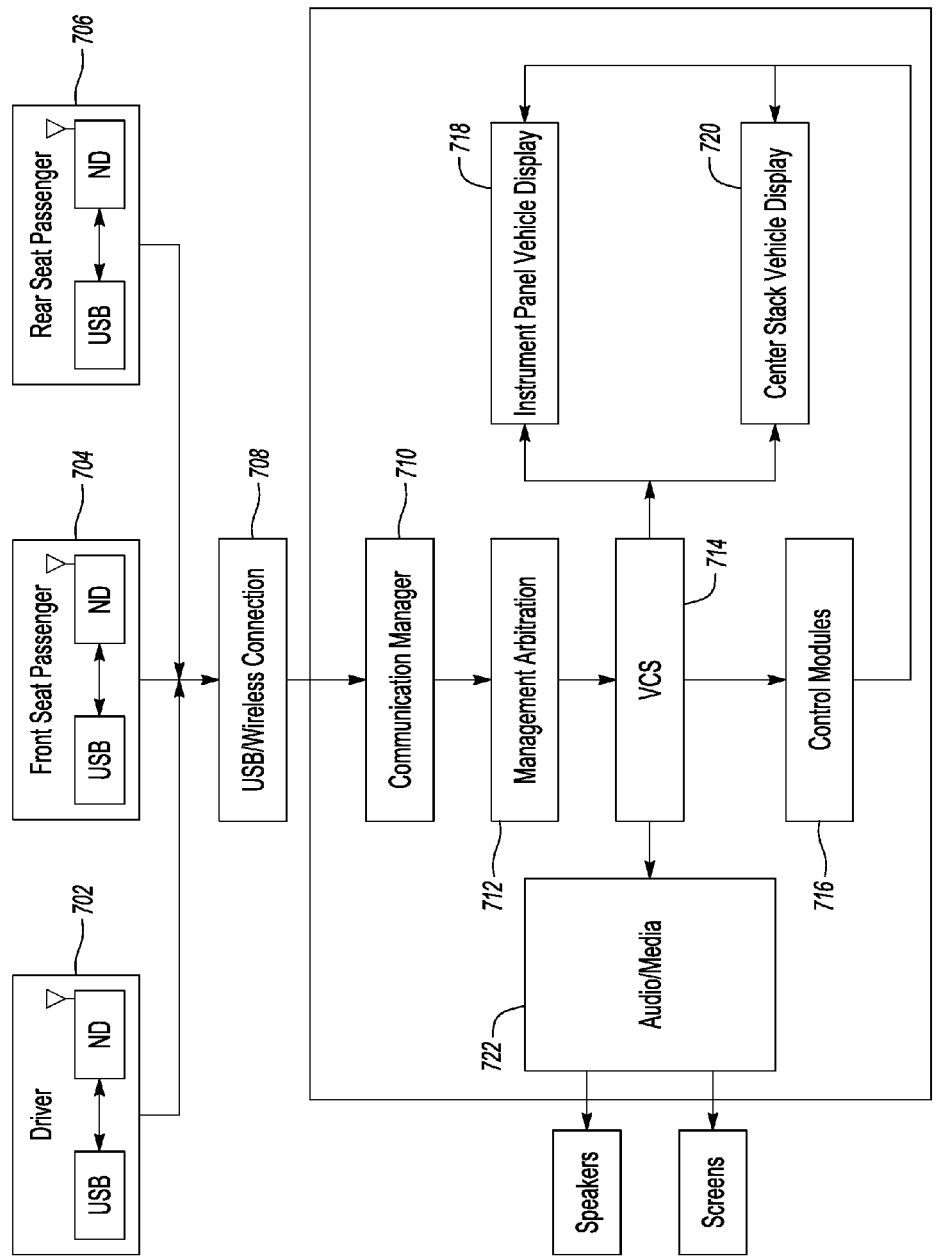
FIG. 7 is a block system architecture of a vehicle computing system having a user-interactive information display system controlled by an occupant's handheld computing device.

FIG. 7 is a block system architecture of a vehicle computing system having a user-interactive information display system controlled by an occupant's nomadic device. The system may have a driver, front seat passenger, and rear seat passenger simultaneously communicating information using their handheld devices to send information from their device and share it with the VCS. The driver handheld device 702 may connect with the VCS using, but not limited to, a USB connection or wirelessly using BLUETOOTH technology. The front seat passenger handheld device 704 may connect with the VCS using, but not limited to, a USB connection or wireless using BLUETOOTH. The rear seat passenger handheld device 706 may connect with the VCS using, but not limited to, a USB connection or wireless using BLUETOOTH.

The system may have a connection 708 allowing occupants to connect their nomadic device to the VCS allowing the system to recognize the device. If the system recognizes the nomadic device, it may connect and begin communication using the systems communication manager 710. The communication manager may assign a priority for each device connected to the VCS. Priority of which handheld device may communicate with a vehicle function or feature when multiple devices are trying to communicate at the same time may be configured by the driver or vehicle owner. An example of priority of which handheld device may override the other devices connected to the VCS may be set to enforce the front passenger to have priority over the back seat passengers. Another example of priority being configured when multiple handheld devices are communicating with the VCS may be that if the driver's handheld device is commanding a playlist, the passengers may not override that infotainment function.

Once communication begins with the connected nomadic device, the system may synchronize the current control status of the vehicle features from the VCS to the nomadic device with the use of the systems management arbitration 712. The synchronization of the current control status may allow the handheld device to see the settings of the selected vehicle feature or function is currently set at. For example, once the handheld device is synchronized with the VCS the passenger may see on the handheld device screen that the current climate control temperature is set at 65 degrees.

The VCS 714 may communicate with the passenger's nomadic device and allow adjustment and controls of vehicle features to take place by the passenger. If the owner or driver configured limited passenger controls of vehicle features, the VCS may restrict or limit some of the passenger commands. Based off the passenger's commands, the VCS may display information to the driver at the instrument panel display 718. The VCS may also display updates, or adjustments made by the passenger to the vehicle control feature at the center stack vehicle display 720. An example of a passenger command being displayed at the instrument panel and/or center stack display may be a passenger sending navigation destination data from their nomadic device to the VCS. For example, if the passenger has looked up a destination that may need to be communicated to the driver, he may connect his smart phone to the VCS and transmit the data from the smart phone to the system for driver display.

An example of a passenger sending data to the audio/media module 722 of the VCS. If the passenger sends a request to play a certain song or play list, the command may be sent from the passenger's nomadic device to the audio/media system of the vehicle allowing the information on the nomadic device to be transmitted to the VCS for sharing. The instruction and commands by the vehicle passenger using their handheld device to communicate with the VCS and other vehicle control modules may exchange the commands via one or more vehicle communication networks 716. Other vehicle systems and features that may communicate with the passenger's nomadic device may include, but is not limited to, climate control, navigation system, and passenger seat controls.

In another example, the passengers may transmit and download data to the VCS. For example, if a rear seat passenger enjoys a playlist that was transmitted from the front seat passenger to the VCS, the rear seat passenger may download that playlist from the VCS to their nomadic device. The passengers may be able to exchange information with each other from their nomadic devices while connected to the VCS.

Figure 8:
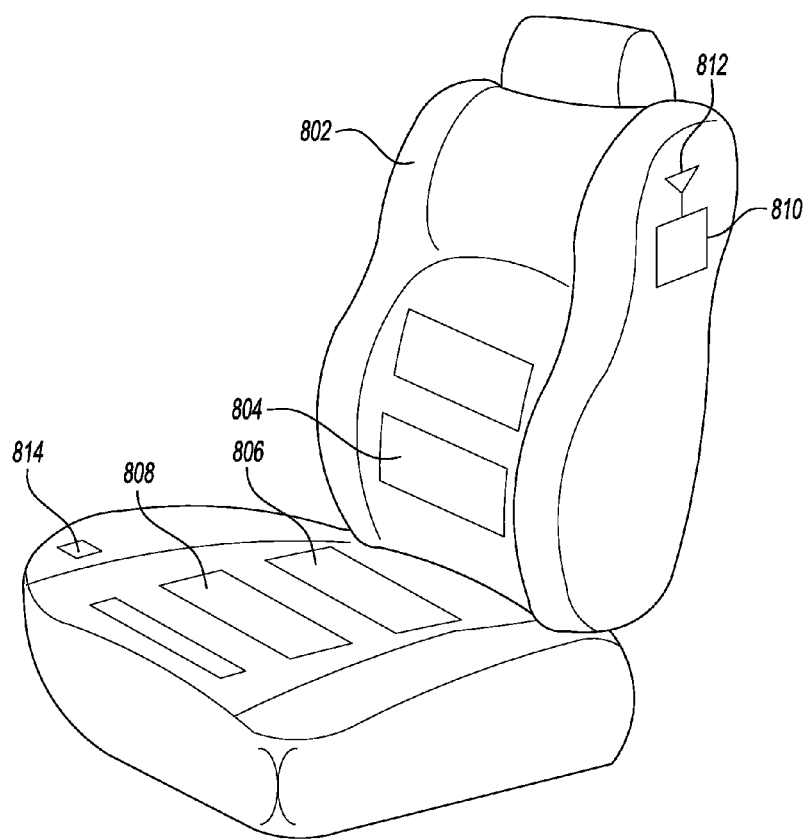
FIG. 8 is a graphical representation of one embodiment of using a seat to identify nomadic device communication control with a vehicle computing system.

FIG. 8 is a graphical representation of one embodiment of using a seat to identify nomadic device communication control with a vehicle computing system. A passenger detection system integrated with the vehicle computing system may allow a nomadic device to communicate VCS functionality controls based on where the passenger is located in the vehicle. This interface embodiment may be implemented to disable certain 'locked out' functionality while the vehicle is in motion. For example, the navigation display may 'lock out' user input if the vehicle is moving. This attempt to 'lock out' certain functionality of a device, feature, or product may be done in the assumption that the user is possibly operating a moving vehicle. In this embodiment, the VCS may detect a nomadic device to a non-driver using a physical connection and/or wireless antenna in connection with one or more seat sensors.

The VCS may allow control of vehicle features and functions with the use of a brought-in device including, but not limited to, a mobile phone, media player and/or tablet. Passenger interaction with the VCS may be determined where the device is connected to the VCS in the vehicle, using wire and/or wireless technology including, but not limited to, USB and BLUETOOTH technology. In an embodiment shown in FIG. 8, the physical connection port 814 is securely mounted to the passenger seat 802. The arrangement allows for employing a system and method for interconnecting a passenger's brought-in handheld device by detecting where the passenger is located in the vehicle. The passenger detection system may monitor one or more seat inputs including, but not limited to, physical connection port 814, vehicle seat wireless transceiver 810, and/or a passenger detection sensor 808. For example, if the passenger connects the nomadic device to the physical connection port 814 (e.g. USB) on the seat, the VCS may detect that the passenger is connecting from that seat 802 by receiving the physical connection port address and/or monitoring the one or more seat sensors 804, 806, 808.

In the example given above, the VCS may determine the amount of access and control a nomadic device may have based on the passengers location in the vehicle. In another example, if the driver connects their nomadic device into the physical connection port 814 of a passenger backseat to try and override the system based on nomadic device location allowing the driver to control 'lock out' features when the vehicle is moving, this system may detect that the driver is not located in the backseat based on one or more seat sensors therefore denying the request for greater VCS control of features and functions that may be allowed to a backseat passenger.

The seat 802 may contain one or more sensors to validate an occupant presence at that seating position in the vehicle. The seat 802 may contain one or more back sensors 804, and one or more seat sensors 806 to ensure an occupant is present in that seat. The seat 802 may also have one or more additional sensors 808 that may detect one or more occupant features including, but not limited to, body temperature, and/or a weight sensor. The seat sensors may be placed on all seats in the vehicle including, but not limited to, front seats, backseats, and/or bench seating.

The seat 802 may also contain a module and/or wireless transceiver 810 having an antenna 812. The module and/or wireless transceiver 810 may communicate to the VCS a detected nomadic device using wireless technology. The module and/or transceiver 810 may be able to identify the location of the passenger based on the detected wireless technology. The VCS may also determine the location of the passenger in the vehicle using the received wireless detection of the nomadic device from the seat transceiver in combination with the one or more seat sensors. For example, if a passenger is sitting in the backseat, the wireless transceiver in the backseat may detect a stronger signal than the wireless transceiver in the driver's seat and/or front passenger seat. The VCS may determine nomadic device location based on the signal strength of the identified wireless device using analysis between one or more wireless transceivers embedded in the vehicle seats and/or vehicle passenger cabin.

In another embodiment, in addition to or in combination of the one or more seat sensors, the vehicle may implement an in-vehicle camera system to identify where a passenger is located in the vehicle before allowing access to vehicle features and functions using the passenger's nomadic device. The in-vehicle camera system may eliminate the use of seat sensors and communicate passenger location to the VCS. The camera system may also communicate with the one or more seat inputs to determine a location of the passenger and the detected nomadic device. The in-vehicle camera system may have a camera mounted on the dashboard.

For example, a passenger may be in the passenger seat of the vehicle and the module and/or wireless transceiver 810 may detect the nomadic device to initiate a handshake between the VCS and detected device. The module and/or transceiver 810 may communicate to the VCS that the wireless device was detected at the passenger seat. The VCS may receive input from the camera system to verify that the occupant is a non-driver and is located in the passenger seat to allow greater access to remote control one or more vehicle features that may normally be 'locked out' when the vehicle is moving using the passenger's mobile device.

Figure 9:
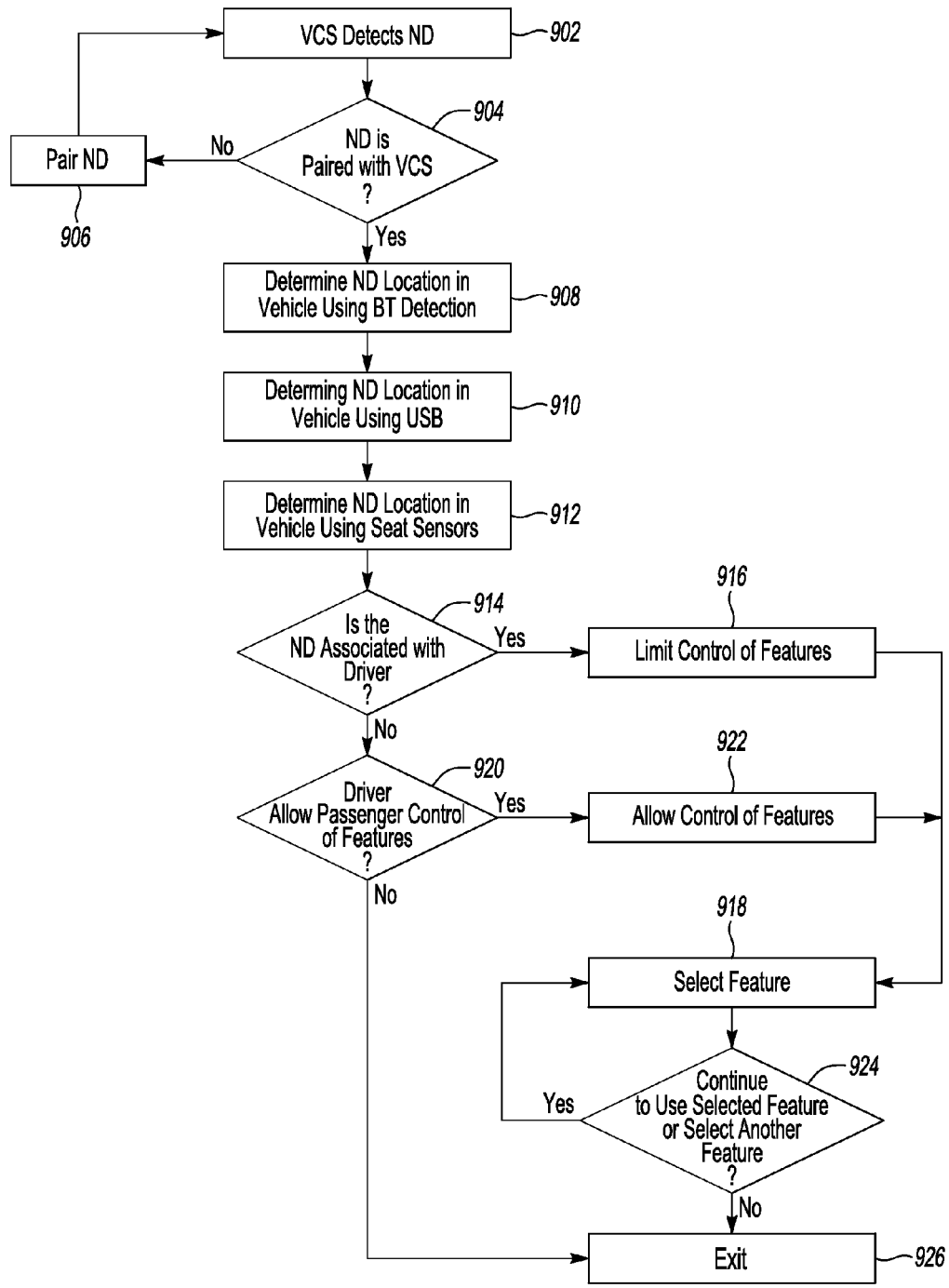
FIG. 9 is a flow chart illustrating an example method of a vehicle computing system detecting occupant location using connected devices.

FIG. 9 is a flow chart illustrating an example method of a vehicle computing system detecting occupant location using connected devices. The passenger nomadic device detection process communicating with the VCS may be implemented through a computer algorithm, machine executable code, non-transitory computer readable storage medium, or software instructions programmed into a suitable programmable logic device(s) of the vehicle, such as the VCS, the entertainment module, other controller in the vehicle, or a combination thereof. Although the various steps shown in the passenger nomadic device detection process flowchart diagram appear to occur in a chronological sequence, at least some of the steps may occur in a different order, and some steps may be performed concurrently or not at all.

At step 902, the VCS may detect a nomadic device using wireless technology and/or by detecting a connection using a physical port. The wireless technology may include, but is not limited to BLUETOOTH technology, WiFi, and/or WiMax network. The VCS may determine if the detected mobile device may have been previously paired with the system at step 904. In another embodiment, the system may not require pairing of the nomadic device.

At step 906, if the nomadic device was not recognized by the VCS the system may begin the paring process of the nomadic device. After the nomadic device has been paired with the VCS, the system may begin to determine the location of the device using BLUETOOTH technology at step 908. For example, the nomadic device may be located in the backseat of the vehicle using a wireless antenna located in the backseat. The VCS may determine that the wireless antenna in the backseat has a stronger BLUETOOTH signal, and transmit that data to the VCS for further analysis. In addition to the backseat wireless transceiver having an antenna detecting the nomadic device BLUETOOTH signal in the backseat, the VCS may also determine nomadic device location by receiving vehicle seat sensor information from the backseat. In addition to receiving backseat sensor data, the VCS may determine if the driver's nomadic device is in communication with the VCS to ensure that the proper assignment of control is established between the driver's nomadic device and the non-driver's nomadic device.

At step 910, the VCS may determine the location of the nomadic device in the vehicle based on physical connections. The nomadic device may be detected by the VCS by a physical connection (e.g. USB) to a port located in the passenger's seat. The physical ports may be assigned with a hardware address so that the VCS may recognize where the nomadic device is being plug in for communication with one or more vehicle features and functions. In combination with determining the location of the nomadic device based on the physical connection port location in the vehicle, the VCS may also look at one or more systems to determine if a passenger is actually at that location. The one or more systems to determine if a passenger is actually at a location in a vehicle may include, but is not limited to vehicle seat sensors, and/or at least one camera.

At step 912, once the nomadic device is recognized the system may perform an analysis of the passenger's nomadic device location using one or more seat sensors in a vehicle. If the system discovers that one nomadic device has been detected, however there is a driver and a non-driver in the vehicle based on the one or more seat sensors, then the system may determine whether or not the nomadic device belongs to the driver using one or more methods at step 914. The one or more methods to determine whether a nomadic device belongs to a driver may include, but is not limited to, previous pairing of the nomadic device, location of the nomadic device in the vehicle cabin using wireless detection, and/or the physical connection of the nomadic device using an assigned USB port.

At step 916, if the nomadic device belongs to a driver, then the VCS may allow limited control of features and functions from that device. The limited control of features and functions may include 'locking out' one or more inputs to vehicle infotainment controls while the vehicle is moving including, but not limited to, navigation control inputs, radio selections, and/or one or more applications based off the nomadic device communicated to the VCS.

At step 920, if the detected nomadic device belongs to a non-driver, the system may determine the amount of control that may be allowed to the non-driver nomadic device. The driver may limit certain vehicle features and functions that a non-driver nomadic device may control including, but not limited to entertainment control, climate control, and/or navigation control. For example, the driver may deny vehicle infotainment control from a backseat passenger's non-driver nomadic device while allowing control to another detected passenger nomadic device sitting in the front passenger seat in a vehicle. The driver and/or vehicle owner may allow or limit a passenger control of vehicle features and function using their nomadic device at step 922. The driver may use the vehicle infotainment system interface to adjust settings and/or limits on a passenger's nomadic device remote control access of the infotainment system. If the driver input rejects a passenger's nomadic device to communicate with one or more vehicle features, the passenger's device may end communication with the VCS at step 926.

At step 918, once the nomadic device is allowed remote infotainment control of vehicle features and/or functions, the user may select one or more vehicle features to control using their device. The nomadic device may continue to control the selected feature and/or decide to exit and select another vehicle feature at step 924. If the nomadic device user decides that she is done communicating with the VCS, and/or the vehicle system has powered down, the nomadic device may end communication to the system at step 926.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A non-transitory computer readable storage medium, storing instructions that, when executed by a processor, program the processor to:
   establish through a single infotainment system a communication connection with at least one of a plurality of computing devices within a vehicle;
   determine if the at least one of a plurality of computing devices is a driver or non-driver computing device;
   if it is determined that the at least one of a plurality of computing devices is a non-driver computing device, enable control to adjust current infotainment settings for the vehicle from the non-driver computing device; and
   if it is determined that the at least one of a plurality of computing devices is a driver computing device, enable a reduced amount of control as compared to the non-driver computing device to adjust current infotainment settings for the vehicle from the driver computing device.

2. The computer readable storage medium of claim 1 wherein the detected location of the communication connection is established at a seat.

3. The computer readable storage medium of claim 2 wherein the seat includes at least one vehicle seat sensor.

4. The computer readable storage medium of claim 2 wherein the seat includes a physical connection port.

5. The computer readable storage medium of claim 2 wherein the seat includes a wireless transceiver.

6. The computer readable storage medium of claim 5 wherein the wireless transceiver is BLUETOOTH technology.

7. The computer readable storage medium of claim 2 wherein the seat includes communication with an in-vehicle camera system.

8. The computer readable storage medium of claim 1 additionally storing instructions to receive driver input limiting the control to adjust settings for the vehicle from the non-driver computing device.

9. A vehicle computing system comprising:
   one or more processors programmed to:
   establish through a single infotainment system a communication connection with at least one of a plurality of computing devices within a vehicle;
   determine if the at least one of a plurality of computing devices is a driver or non-driver computing device based on the communication connection;
   if it is determined that the at least one of a plurality of computing devices is a non-driver computing device, enable control to adjust current infotainment settings for the vehicle from the non-driver computing device; and
   if it is determined that the at least one of a plurality of computing devices is a driver computing device, enable a reduced amount of control as compared to the non-driver computing device to adjust current infotainment settings for the vehicle from the driver computing device.

10. The vehicle computing system of claim 9 wherein the detected location of the communication connection is established at a seat.

11. The vehicle computing system of claim 10 wherein the seat includes a physical connection port.

12. The vehicle computing system of claim 10 wherein the seat includes a vehicle seat wireless transceiver.

13. The vehicle computing system of claim 12 wherein the wireless transceiver is BLUETOOTH technology.

14. The vehicle computing system of claim 10 wherein the seat includes at least one vehicle seat sensor.

15. The vehicle computing system of claim 9 wherein the one or more processors are additionally programmed to allow a driver to limit infotainment control from the non-driver computing device.

16. A method comprising:
    establishing through a single infotainment system a communication connection with at least one of a plurality of computing devices within a vehicle;
    enabling control to adjust infotainment settings for the vehicle in response to a determination that a detected location of the communication connection is a non-driver location; and
    restricting control as compared to a non-driver location to adjust infotainment settings based on the detected location being a driver location.

17. The method of claim 16 wherein the location of the communication connection is detected using one or more seat inputs.

18. The method of claim 17 wherein the one or more seat inputs include a wireless transceiver.

19. The method of claim 17 wherein the one or more seat inputs include at least one passenger detection sensor.

20. The method of claim 17 wherein the one or more seat inputs include a physical connection port address.

\* \* \* \* \*